United States Patent
Hursh et al.

(10) Patent No.: US 12,461,942 B2
(45) Date of Patent: Nov. 4, 2025

(54) CURATED PORTABLE DATAMART

(71) Applicant: TEACHERS INSURANCE AND ANNUITY ASSOCIATION OF AMERICA, New York, NY (US)

(72) Inventors: Daniel Ray Hursh, Dayton, OH (US); Sheppard David Narkier, Charlotte, NC (US); Alexis Salvatore Pecoraro, Huntersville, NC (US)

(73) Assignee: TEACHERS INSURANCE AND ANNUITY ASSOCIATION OF AMERICA, New York, NY (US)

( * ) Notice: Subject to any disclaimer, the term of this patent is extended or adjusted under 35 U.S.C. 154(b) by 0 days.

(21) Appl. No.: 18/424,670

(22) Filed: Jan. 26, 2024

(65) Prior Publication Data
US 2025/0245243 A1    Jul. 31, 2025

(51) Int. Cl.
*G06F 16/28*    (2019.01)
*G06F 21/62*    (2013.01)

(52) U.S. Cl.
CPC ........ *G06F 16/283* (2019.01); *G06F 21/6227* (2013.01)

(58) Field of Classification Search
None
See application file for complete search history.

(56) References Cited

U.S. PATENT DOCUMENTS

| | | | | |
|---|---|---|---|---|
| 7,398,187 B2* | 7/2008 | Tinseth | ................... | G06Q 10/10 |
| | | | | 702/187 |
| 8,880,682 B2* | 11/2014 | Bishop | .................... | H04L 43/04 |
| | | | | 709/224 |
| 10,474,724 B1* | 11/2019 | Prayaga | .............. | G06F 16/9535 |
| 10,749,764 B2* | 8/2020 | Kim | ...................... | H04L 43/024 |
| 11,120,142 B2* | 9/2021 | Chen | .................. | G06F 16/3331 |
| 11,550,923 B2* | 1/2023 | Weber | ................. | G06F 11/3604 |
| 12,045,201 B1* | 7/2024 | Satish | ................... | G06F 16/283 |
| 12,223,030 B2* | 2/2025 | Kakui | ................... | G06F 21/604 |
| 2011/0145657 A1* | 6/2011 | Bishop | ................ | H04L 63/1433 |
| | | | | 714/47.1 |

(Continued)

OTHER PUBLICATIONS

On Automating Basic Data Curation Tasks (Year: 2017).*

*Primary Examiner* — Kim T Nguyen
(74) *Attorney, Agent, or Firm* — MARSHALL, GERSTEIN & BORUN LLP; Randall G. Rueth

(57) ABSTRACT

A curated portable datamart system, method, and apparatus are provided. The method, implemented by one or more processors, comprises: inputting, via an application programming interface (API), a client query of a client, the client query requesting a temporal output able to be calculated by individual-specific raw data identifiable within the raw data of a virtual raw datamart; invoking a security and client context layer to authorize the client to access the individual-specific raw data that is specific to the client query; responsive to authorizing the client query, invoking a semantic layer to retrieve the individual-specific raw data from the virtual raw datamart, and curate the individual-specific raw data to generate a curated data deliverable, the curated data deliverable comprising temporal data generated from one or more raw data items accessed by the semantic layer from the virtual raw datamart; and outputting, via the API, the curated data deliverable.

20 Claims, 6 Drawing Sheets

(56) References Cited

U.S. PATENT DOCUMENTS

| | | | | |
|---|---|---|---|---|
| 2017/0220964 A1* | 8/2017 | Datta Ray | ............ | H04L 63/1433 |
| 2019/0147172 A1* | 5/2019 | Chen | ................ | G06F 16/90344 |
| | | | | 713/193 |
| 2019/0179946 A1* | 6/2019 | Cui | ..................... | G06F 16/9538 |
| 2019/0379678 A1* | 12/2019 | McLean | ................ | G06F 16/285 |
| 2020/0082112 A1* | 3/2020 | Altshuler | ............ | G06F 21/6227 |
| 2021/0303696 A1* | 9/2021 | Weber | ................... | G06F 21/577 |
| 2022/0319311 A1* | 10/2022 | Yousaf | ................ | G08G 1/0112 |
| 2022/0405377 A1* | 12/2022 | Kakui | ................ | G06F 16/2452 |
| 2024/0276222 A1* | 8/2024 | Colom Ikuno | ..... | H04W 12/069 |
| 2025/0182223 A1* | 6/2025 | Strnad, II | ............... | G06Q 40/06 |
| 2025/0217860 A1* | 7/2025 | Durvasula | .......... | G06Q 30/0621 |

* cited by examiner

Please define rules

Employee groups

Department: [ marketing ] — 202
Title: [ ] — 204
Level: [ ] — 206
Join the company by: [ MM/DD/YYYY ] — 208
Cumulative work hours: [ ] — 210
Eligible for plan: [ Plan A ] — 212

Preview:

Rule priority = 1, department = marketing, eligible plan = Plan A. — 216

[ Preview Rule Definition ] — 220
[ Re-Define Current Rule ] — 222
[ Define New Rule ] — 224
[ Submit Rule Definitions ] — 226

Please describe your query

<u>Query eligibility</u>

Select plan ▭ ⟵ 230

Select employee ▭ ⟵ 232

<u>Query employee statistics</u>

Select plan ▭ Plan A ⟵ 234

Payroll: ☐ Sum ☒ Average ☐ Median ☐ Graph ⟵ 236

Contribution Amount: ☐ Sum ☐ Average ☐ Median ☐ Graph ⟵ 238

Contribution Percentage: ☐ Sum ☐ Average ☐ Median ☐ Graph ⟵ 240

Submit Query ⟵ 250

CURATED PORTABLE DATAMART

FIELD OF TECHNOLOGY

The present disclosure relates to curated portable datamart systems, methods, and computer readable medium, and more particularly, to curated portable datamart systems, methods, and computer readable medium storing computing instructions for generating curated deliverables based on a client query.

BACKGROUND

Data curation is a process of organizing, enhancing, and maintaining data for various purposes, such as analysis, sharing, or preservation. Traditional approaches of curating data typically involve a large, centralized "enterprise warehouses." Such traditional approaches may result in costly and complex solutions in order to ensure the quality of the data, the performance necessary to meet client demands, and the security to ensure isolation of data between clients. The traditional approaches may also lack the ability to easily integrate client specific or client in house data and reporting to provide more comprehensive solutions. Therefore, there is a need for techniques that can automatically curate data in an efficient, secure, and portable way.

SUMMARY

One exemplary embodiment of the present disclosure may be a curated portable datamart system configured to generate curated data deliverables. The curated portable datamart system may comprise: one or more processors communicatively coupled to one or more computer memories; and a virtual raw datamart having stored thereon raw data comprising one or more raw data items, the virtual raw datamart communicatively coupled to the one or more processors; a semantic layer stored on the one or more computer memories and comprising computing instructions configured to access the virtual raw datamart, the computing instructions of the semantic layer implementing client-specific rules defining code for generating temporal data from one or more raw data items upon the semantic layer accessing the virtual raw datamart; a security and client context layer stored on the one or more computer memories and comprising computing instructions configured to access the semantic layer; and an application programming interface (API) stored on the one or more computer memories and comprising computing instructions configured to access the security and client context layer, the computing instructions of the API further configured to receive requests a client device. The computing instructions of the API, when executed by the one or more processors, may cause the one or more processors to: (1) input a client query of a client, the client query requesting a temporal output able to be calculated by individual-specific raw data identifiable within the raw data of the virtual raw datamart; (2) invoke the security and client context layer to authorize the client to access the individual-specific raw data that is specific to the client query; (3) responsive to authorizing the client query, invoke the semantic layer to (i) retrieve the individual-specific raw data from the virtual raw datamart, and (ii) curate the individual-specific raw data to generate a curated data deliverable, the curated data deliverable comprising temporal data generated from the one or more raw data items accessed by the semantic layer from the virtual raw datamart; and (4) output the curated data deliverable.

Another exemplary embodiment of the present disclosure may be a curated portable datamart method for generating curated data deliverables. The method may comprise: (1) inputting, via an application programming interface (API), a client query of a client, the client query requesting a temporal output able to be calculated by individual-specific raw data identifiable within the raw data of a virtual raw datamart; (2) invoking a security and client context layer to authorize the client to access the individual-specific raw data that is specific to the client query; (3) responsive to authorizing the client query, invoking a semantic layer to (i) retrieve the individual-specific raw data from the virtual raw datamart, and (ii) curate the individual-specific raw data to generate a curated data deliverable, the curated data deliverable comprising temporal data generated from the one or more raw data items accessed by the semantic layer from the virtual raw datamart; and (4) outputting, via the API, the curated data deliverable.

Yet another exemplary embodiment of the present disclosure may be a computer readable storage medium storing computing instructions for generating curated data deliverables. The computing instructions, when executed by one or more processors, cause the one or more processors to: (1) input, via an application programming interface (API), a client query of a client, the client query requesting a temporal output able to be calculated by individual-specific raw data identifiable within the raw data of a virtual raw datamart; (2) invoke a security and client context layer to authorize the client to access the individual-specific raw data that is specific to the client query; (3) responsive to authorizing the client query, invoke a semantic layer to (i) retrieve the individual-specific raw data from the virtual raw datamart, and (ii) curate the individual-specific raw data to generate a curated data deliverable, the curated data deliverable comprising temporal data generated from the one or more raw data items accessed by the semantic layer from the virtual raw datamart; and (4) output, via the API, the curated data deliverable.

BRIEF DESCRIPTION OF THE DRAWINGS

The figures described below depict various aspects of the system and methods disclosed therein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

There are shown in the drawings arrangements which are presently discussed, it being understood, however, that the present embodiments are not limited to the precise arrangements and instrumentalities shown, wherein:

FIG. 2A depicts an example user interface (UI) configured for a client to submit rule definitions, according to some embodiments.

FIG. 2B is similar to FIG. 2A, but in which the UI is configured for a client to submit a query.

Figure 1:
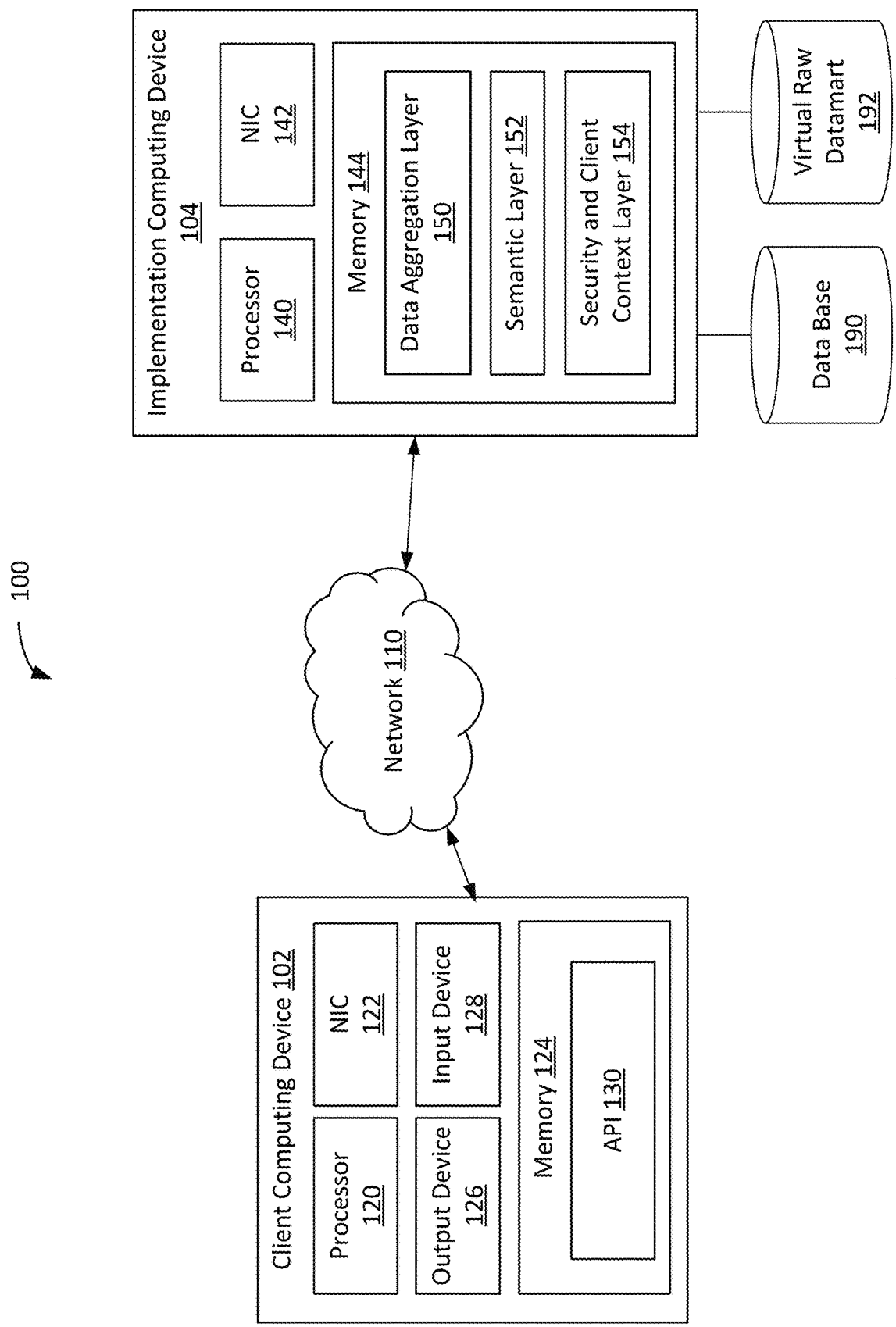
FIG. 1 is a block diagram of an example computing system in which curated portable datamart techniques can be implemented, according to some embodiments.

The figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

The disclosure provides a system, method, and apparatus for generating curated data deliverables.

As used herein, the term "client" refers to a person using an application that implements the techniques disclosed herein. The term "individual" refers to persons with whom the raw data used in the techniques disclosed herein are associated with. The term "temporal data" refers to data that are generated in response to a client query but do not exist in the raw data before the client query.

In one aspect, the techniques disclosed herein may generate client-specific rules defining code that implements rule definitions made by a specific client. This allows the client to make customizable rules.

In one aspect, the techniques disclosed herein may generate temporal data. That is, the techniques disclosed herein may generate data in response to a client query on the fly. This is contrary to certain traditional techniques in which all data for answering client's queries are calculated beforehand, and retrieving such calculated data based on the client's queries. The techniques for generating temporal data disclosed herein is advantageous because such techniques would save a substantial space for data storage while maintaining the use experience and reliability of the generated data. Further, generating temporal data on the fly ensures that the resulting temporal data is based on real-time data. Therefore, this approach also increases the accuracy of the resulting temporal data.

In one aspect, the techniques disclosed herein may virtually segregate client-specific data or individual-specific data. In this way, a client authorized to access a portion of the raw data may be prevented from accidentally or intentionally accessing other portions of the raw data to which the client is not authorized to access. Further, this approach would increase the difficulty for an illicit actor to hack the entire database, and thereby reducing the risks of data divulge.

In one aspect, the techniques disclosed herein may use different software layers to aggregate and curate data. With different layers dedicated to different functionalities, the overall operation cost is generally decreased.

In one aspect, the techniques disclosed herein may require a client to use an API to interact with the functionalities provided by the techniques. In this way, while the client may use the techniques disclosed herein with no barrier, yet the client may not access the source code and the internal operation processes, which generally makes the system more secure.

In one aspect, the techniques disclosed herein may generate portable data deliverables. That is, different than the traditional approaches which typically use a large, centralized database, the techniques disclosed herein allow the client to take a piece of the database that includes the data matters to the client only by viewing, downloading, physically taking, or integrating it into the client's platform. In this way, the techniques strikes a balance between a single centralized system and a distributed system, and make the process of curating data more efficient. The various options of the portable data deliverables also provide flexibility to the client with different needs.

Other advantages and benefits will be clear in view of the detailed description below.

Example Computing System

FIG. 1 illustrates an example system 100 in which one or more curated portable datamart techniques may be implemented. The example system 100 may include a client computing device 102, an implementing computing device 104, a training computing device 106, and a network 110. The client computing device 102, the implementing computing device 104, and the training computing device 106 may be remote from each other and are communicatively connected via the network 110.

The network 110 may be a single communication network (e.g., the Internet), and in some embodiments may also include one or more additional networks. As just one example, the network 110 may include a cellular network, the Internet, and a server-side local area network (LAN).

The client computing device 102 is generally configured to receive input from a client and present output to the client. While FIG. 1 shows only a single client computing device 102, it should be understood that the system 100 may include any suitable number of similar client computing devices operating according to the principles disclosed herein. The client computing device 102 may be or include any stationary, mobile, or portable computing device with wired and/or wireless communication capability (e.g., a smartphone, a tablet computer, a laptop computer, a desktop computer, a smart wearable device, etc.). In the example embodiment of FIG. 1, the client computing device 102 includes a processor 120, a network interface controller (NIC) 122, and memory 124. The client computing device 102 may further include or be associated with an output device 126 and an input device 128.

The processor 120 may be a single processor (e.g., a central processing unit (CPU)), or may include a set of processors (e.g., multiple CPUs, or one or more CPUs and one or more graphics processing units (GPUs)). Although the output device 126 is depicted as part of the client computing device 102, it should be understood that the output device 126 may be external to the client computing device 102 and communicatively connected to the client computing device 102 with wires and/or the network 110.

The output device 126 may include hardware, firmware, and/or software configured to enable a client to view visual outputs of the client computing device 102, and may use any suitable display technology (e.g., LED, OLED, LCD, etc.). Moreover, in some embodiments where the client computing device 102 is a wearable device, the output device 126 may be a transparent viewing component (e.g., lenses of VR glasses) with integrated electronic components. For example, the output device 126 may include micro-LED or OLED electronics embedded in lenses of smart glasses.

The input device 128 is capable of receiving inputs from the ambient environment and/or a client, such as a keyboard, a mouse, buttons, keys, a microphone, etc. Further, the input device 128 may be integrated with the output device 126 as a touch screen having both input and output capabilities.

The network interface controller (NIC) 122 may include hardware, firmware, and/or software configured to enable the client computing device 102 to exchange electronic data with the implementation computing device 104 via the network 110. For example, the NIC 122 may include a cellular communication transceiver, a Wi-Fi transceiver, and/or transceivers for one or more other wired and/or wireless communication technologies.

The memory 124 may include one or more computer-readable, non-transitory storage units or devices, which may include persistent (e.g., hard disk) and/or non-persistent memory components. The memory 124 may store instructions that are executable by the processor 120 to perform various operations, including the instructions of various software applications and the data generated and/or used by such applications.

In the example embodiment of FIG. 1, the memory 124 may store at least an API module 130. The API module 130 may include instructions for receiving rule definitions and client queries from a client, and outputting curated data deliverables to the client.

In some embodiments, the API module 130 may be omitted. In some embodiments, the client computing device 102 may be omitted. That is, the implementation computing device 104 may receive rule definitions and client queries from the client and output curated data deliverables to the client directly.

The implementation computing device 104 is generally configured to generate curated data deliverables. The implementation computing device 104 may include a processor 140, a network interface controller (NIC) 142, and memory 144.

The processor 140 may be a single processor or may include two or more processors. The implementation computing device 104 may include one or more servers, for example, which may reside at a single location or multiple locations. In some embodiments, the implementation computing device 104 may be a cloud computing platform.

The NIC 142 may include hardware, firmware, and/or software configured to enable the implementation computing device 104 to exchange electronic data with the client computing device 102 and other, similar to client devices via the network 110. For example, the NIC 142 may include a wired or wireless router and a modem.

The memory 144 may be a computer-readable, non-transitory storage unit or device, or collection of units/devices, which may include persistent and/or non-persistent memory components. The memory 144 may store the instructions of a data aggregation layer 150, a sematic layer 152, and a security and client context layer 154, each of which may be executed by the processor 140.

The data aggregation layer 150 may include instructions for aggregating data from a data base 190 or an external data service (undepicted). The data aggregation layer 150 may store the aggregated data in a virtual raw datamart 192 as will be described below with respect to FIG. 3 at the data aggregation stage.

The sematic layer 152 may include instructions for generating computer code to implement rules definitions and mathematical operations based on client queries, as will be described below with respect to FIG. 3 at the rule definition and client query stages, respectively.

The data aggregation layer 150 may include instructions for authorizing client queries, including authorizing the client to access individual-specific raw data, as will be described below with respect to the security and client context layer 312 in FIG. 3.

Example User Interface

Rule Definition

FIG. 2A depicts an example user interface (UI) 200A for a client to define rules. In the depicted example UI 200A, the client may define rules for eligibility of different employee groups with respect to different retirement plans. However, it should be understood that the techniques disclosed herein is not limited to the example, and the client may define any rules for any purposes using the techniques disclosed herein.

As depicted, the client may define an employee group by selecting at least one of a department of the employee group, a title of the employee group, a level of the employee group, a starting date of the employee group, or a cumulative work hour of the employee group by interacting with the input boxes 202-210, respectively. For example, as depicted, if the client selects a department with the input box 202 as "marketing", and does not interact with input boxes 204-210, the employee group is defined by the selected department "marketing" alone.

The client may then define, by interacting with input box 212, whether the selected employee group is eligible for any retirement, and if yes, what retirement plan. For example, as depicted, the client may select that the selected employee group is eligible for "Plan A" with input box 212.

The UI 200A may include a preview window 216. After the client defines a desired rule, the client may interact with a selectable element "Preview Rule Definition" 220. In response, the UI 200A may present a previewed version of the rule to the client. If the client wishes to change the rule based on the preview, the client may interact with the selectable element "Re-Define Current Rule" 222 to re-define the rule in a similar process as defining the rule for the first time.

If the client wishes to define another rule, the client may interact with the selectable element "Define New Rule" 234 to define a new rule in a similar way as defining the first rule. In some embodiments, the client may edit the rules in the preview window, for example, to edit the priorities of the rules.

After the client defines all desired rules, the client may interact with the selectable element "Submit Rule definitions" 236 to submit the rules. In response, the system may generate a set of computer code based on the submitted rules, as will be described below with respect to FIG. 3.

Client Query

FIG. 2B depicts a UI 200B similar to FIG. 2A, but the UI 200B is configured to allow a client to submit a query. In the depicted example UI 200B, the client may query whether a particular employee is eligible for a particular retirement plan, and the statistics of employees under a particular retirement plan. However, it should be understood that the techniques disclosed herein is not limited to the example, and the client may query any information using the techniques disclosed herein.

As depicted, the client may select a particular retirement plan by interacting with an input box 230 and a particular employee by interacting with an input box 232. The client may then select a selectable element 250 to submit the query.

Additionally or alternatively, the client may select a particular plan by interacting with an input box 234. The client may select one or more query items using the interactable elements 236-240. In the depicted example, the client selects "Plan A" and an average amount of payrolls, such that the client will selects to query the average payroll of employees under retirement plan A.

After making all desired queries as described above, the client may submit the query by interacting with the selectable element 250. In response, the system may curate relevant raw data to produce an answer to the one or more queries, as will be described below with respect to FIG. 2B.

Figure 2C:
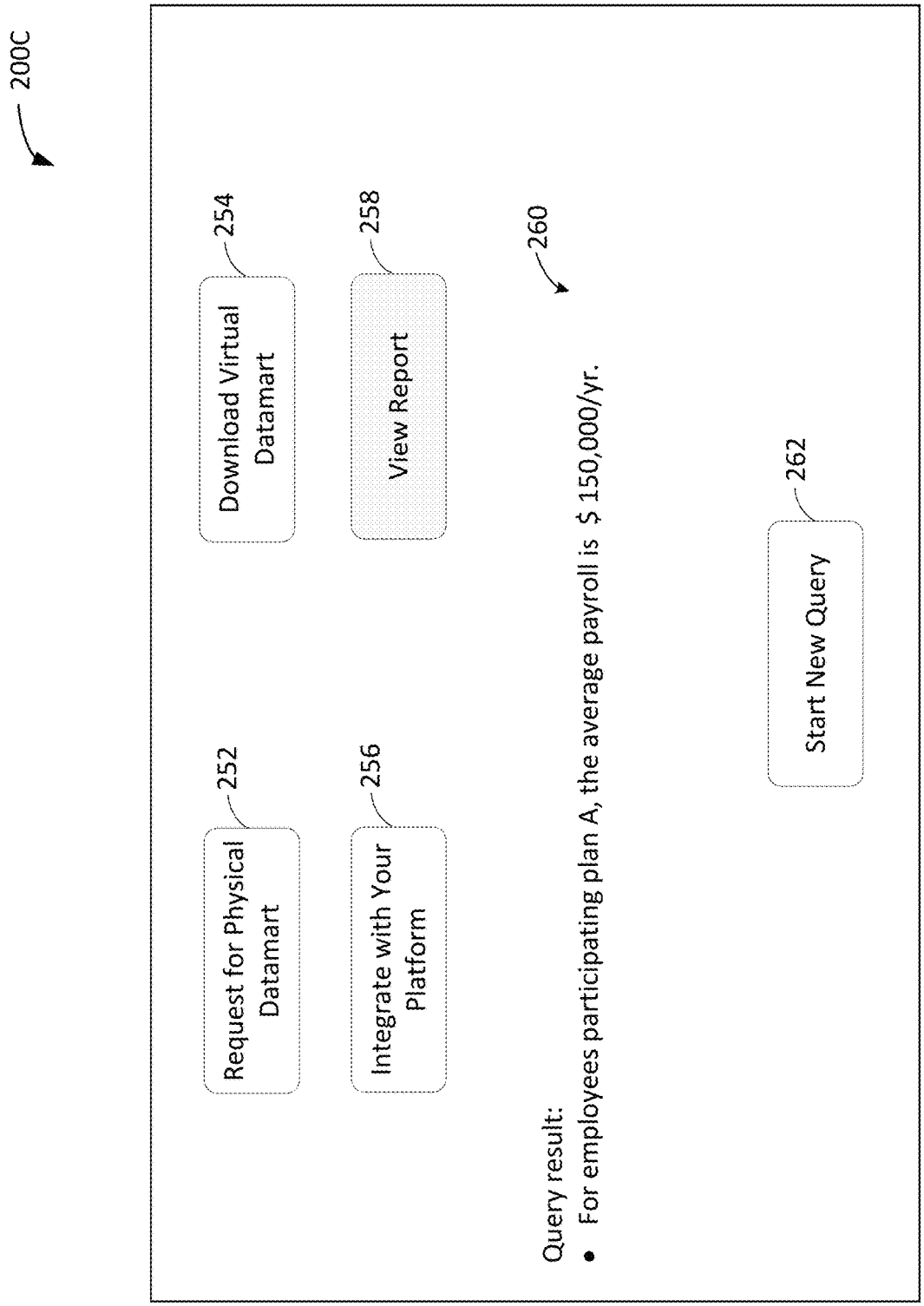
FIG. 2C is similar to FIG. 2B, but in which the UI is configured to show curated data deliverables in response to the query.

FIG. 2C depicts a UI 200B similar to FIG. 2A, but in FIG. 2C the client has submitted one or more queries. After the client submits the one or more queries, the UI 200C may present four selectable elements corresponding to four choices, "Request for Physical Datamart" 252, "Download Virtual Datamart" 254, "Integrate with Your Platform" 256, and "View Report" 258.

If the client selects "Request for Physical Datamart" 252, an entity running an application of the UI 200A-C may provide the requested data in a physical data storage. If the client selects "Download Virtual Datamart" 254, the application may begin downloading the requested data to a client computing device running the application. If the client selects "Integrate with Your Platform" 256, the application may invoke the client's data analysis platform, and integrate the requested data into the client's platform. If the client selects "View Report" 258, the UI 200C may present the requested data. More details of outputting the requested data in the different four manners will be described below with respect FIG. 3.

In the depicted example, the client selects to view the report by interacting with the selectable element 258. In response, the UI 200C shows the requested data as a query result 260. The UI 200C may also include a selectable element "Start New Query" 262 to allow the client to submit a new query in a similar way described above.

Example Implementation Process

Figure 3:
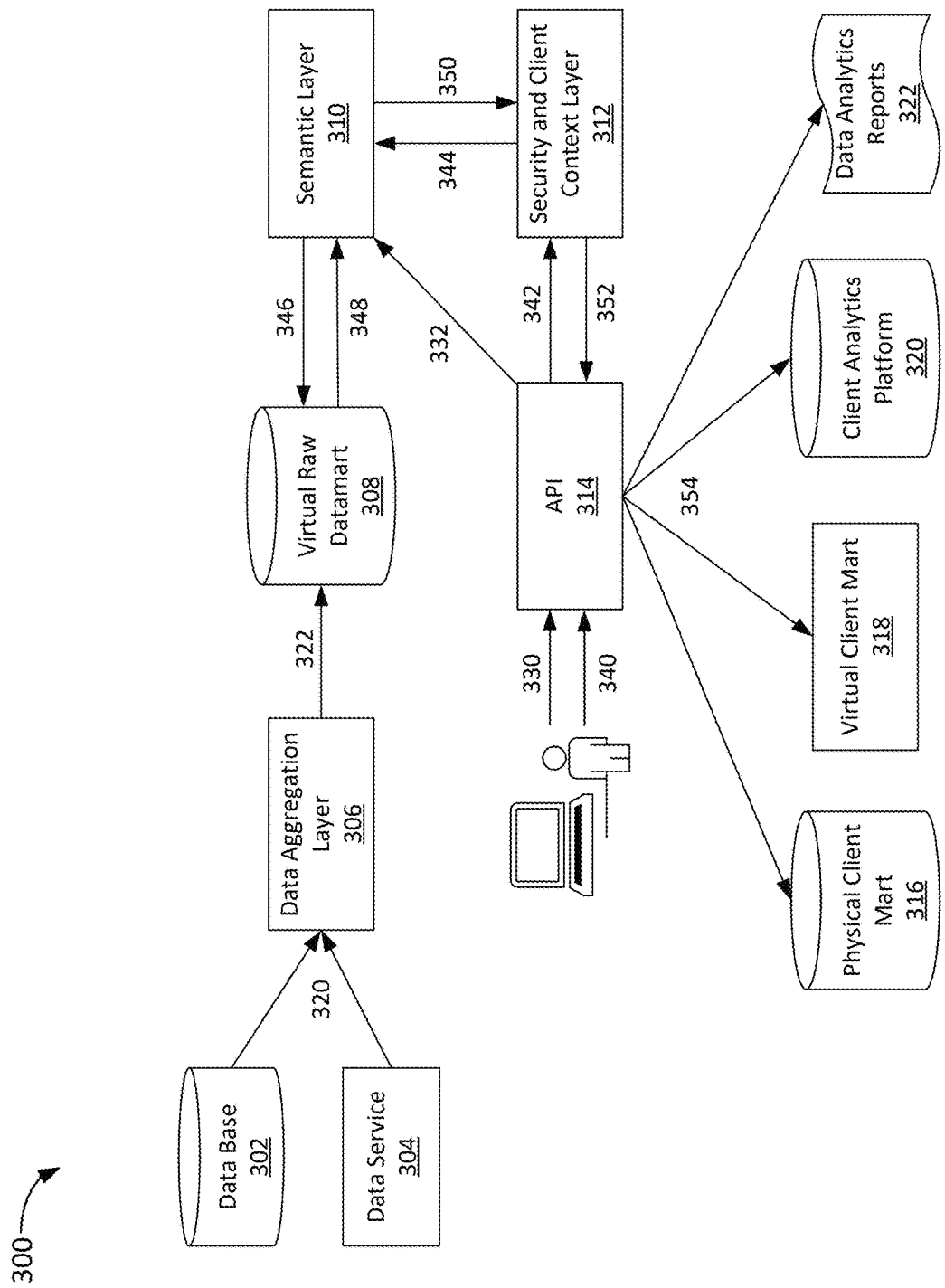
FIG. 3 is a block diagram of an example process in which curated portable datamart techniques can be implemented, according to some embodiments.

FIG. 3 depicts an example process 300 for implementing curated portable datamart techniques disclosed herein. The process may generally include (i) a data aggregation stage, (ii) a rule definition stage, and (iii) a query stage.

With further reference to FIG. 1, the processor 140 may execute (i) the instructions of the data aggregation layer 150 to aggregate data, (ii) the instructions of the semantic layer 152 to allow a client to define rules and make queries, and (iii) the instructions of the security and client context layer to perform necessary authorization and/or authentication. The instructions may be, by way of non-limiting examples, in an object-oriented programming language such as C++, C #, Java, or the like, or a non-object-oriented programming language such as C, Fortran, Pascal, or the like.

Data Aggregation Stage

In the data aggregation stage, a data base 302 (such as the data base 190) and/or data service 304 inputs (320) raw data into a data aggregation layer 306 (such as the data aggregation layer 150). The data base 302 may input (320) raw data into the data aggregation layer 306 in batches. Conversely, the data service 304 may input (320) raw data into the data aggregation layer 306 in stream. In some embodiments, each data item of the raw data may be data specific to an individual, such as the employees described above.

The data aggregation layer 306 may input the raw data into a virtual raw datamart 308 (such as the virtual raw datamart 192). The virtual raw datamart 308 may include a plurality of portions that are virtually segregated from each other. Each portion may be dedicated to a different client or a different individual. In some embodiments, a virtual segregation is to require separate authorization to access different portions. For example, a security and client context layer 312 (described below) may authorize a client to access a particular portion of the virtual raw datamart, but that does not necessarily give the client authorization to access a different portion of the virtual raw datamart. In other embodiments, a virtual segregation is to use different Internet Protocol (IP) addresses for different portions of the virtual raw datamart, respectively. In this way, an illicit actor that somehow manages to hack a portion of the virtual raw datamart would at least need to figure out the IP address of another portion of the virtual raw datamart to be able to hack the other portion. Therefore, the virtual segregation improves the safety of the virtual raw datamart.

In some embodiments, a client may select or define customized or idiosyncratic data formats. Such customized or idiosyncratic data formats may be different from the data formats for other clients. Accordingly, different portions of the virtual raw datamart 308 dedicated to different clients may include data items in different data formats.

Rule Definition Stage

In the rule definition stage, the client may define rules for any purposes. For example, the client may define the conditions for an employee to be eligible for a particular retirement, such as the scenario described above with respect to FIG. 2A.

The client may define (330) the rules via an API 314 (such as the API module 130). As described with respect to FIG. 2A, the client may define (330) the rules by selecting the options provided by the API 314. Upon the client submitting the rule definition with the API 314, the API 314 may transmit (332) the rule definitions to a semantic layer 310 (such as the semantic layer 152). Upon receiving the rule definitions, the semantic layer 310 may generate code that implement the rules.

In the embodiments where the rule definitions are a set of selected options provided by the API 314, the semantic layer 310 may generate the code in a rule-based manner. For example, the semantic layer 310 may have different sets of code corresponding to the options selected by the client, respectively. Upon receiving the selected options, the semantic layer 310 may generate the code the implement the selected rules by retrieving the corresponding set of code. As another example, the semantic layer 310 may include code templates. When the semantic layer 310 receives the selected options, the semantic layer 310 may generate the set of code based on the selected options and the code templates.

Query Stage

At some point, a client may wish to query data for certain purposes, such as the scenarios described above with respect to FIG. 2B.

The client may query (340) information/data via the API 314. In some embodiments, the client may submit the queries via a different API than the API for submitting rule definitions. As described with respect to FIG. 2B, the client may query (340) data by selecting the options provided by the API 314.

Upon receiving the client query, the API 314 may invoke (342) a security and client context layer 312 (such as the security and client context layer 154) to authorize the client query. The authorization may include authorizing the client to access raw data relevant to the client query and/or authorizing the client to obtain the answer to the client query. As described above, each data item of the raw data may be specific to a respective individual. Accordingly, the authorization may include authorizing the client to access individual-specific raw data.

The security and client context layer 312 may authorize the client query based on the client's credentials, such as the client's account name and password. In some embodiments, the security and client context layer 312 may authorize the client query using a two-factor authentication mechanism. For example, the security and client context layer 312 may first authenticate the client's credentials, and then prompt the client to verify his or her identity in a client device different than the device making the client query. Upon receiving the verification from the client device, the security and client context layer 312 may authorize the client query.

In some embodiments, the security and client context layer 312 may authorize the client query further based on contextual information. The contextual information may include the client's role or level in an entity, and/or other attributes of the client. To this end, the security and client context layer 312 may request or automatically retrieve the contextual information via the API 314 or from a database that comprises such information. The security and client context layer 312 may include policies that determines whether a client in a particular role, of a particular level, or with a particular attribute can access certain raw data or obtain certain information. The security and client context layer 312 may determine whether the client has the authority to access the relevant raw data and/or the answer to the client query based on the client's role, level, or other attributes.

Upon the security and client context layer 312 authorizes the client query, the security and client context layer 312 may pass (344) the client query to the semantic layer 310. Additionally or alternatively, the security and client context layer 312 may transmit an indication of authorization to the API 314. In response, the API 314 may invoke the semantic layer 310 to process the client query. The API 314 may further pass the indication of authorization to the semantic layer 310 and the semantic layer 310, responsive to receiving the indication of authorization, may process the client query.

To process the client query, the semantic layer 310 may request (346) raw data (in some embodiments, individual-specific raw data) from the virtual raw datamart. The request may include an indication of authorization issued by the security and client context layer 312. The virtual raw datamart 308, responsive to the request (346) and optionally the indication of authorization, may input (348) the requested raw data to the semantic layer 310.

Upon receiving the requested raw data, the semantic layer 310 may curate the raw data to generate a curated data deliverable. In some embodiments, curating the raw data may include performing one or more mathematical operations the raw data. For example, the raw data may include payroll information for every employee of the client. The client's query may be a sum of the employees' payroll. Because the raw data does not include a sum of the employees' payroll, the semantic layer 310 must calculate the sum. Accordingly, the semantic layer 310, upon receiving the payroll data, may perform a summation operation on the raw data to calculate a sum of the employee payrolls. The resulting sum data is a temporal data, that is, the result has to be determined at the time of processing client query as the result is not readily available without processing the raw data. In some embodiments, the curated data deliverable includes such temporal data.

In some embodiments, the semantic layer 310 may curate the data using a Web Ontology Language (OWL) standard. In this way, the curated data deliverables may be in various formats, and in some embodiments, include a graphical representation (such as an ontology model) that shows a relationship (e.g., logical relationship) among data items. In some embodiments, the semantic layer 310 may generate or receive a graphical representation (such as an ontology model) that shows a relationship among the data items of the raw data. The graphical representation of the raw data may be mapped to the graphical representation of the curated data deliverables, such as a node of the graphical representation of the raw data representing a particular data item may be mapped to a node graphical representation of the curated data deliverables that presents the same particular data item.

To curate the raw data, the semantic layer 310 may generate a set of computer code to implement the mathematical operations. In the embodiments where the client makes the queries by selecting options provided by the API 314, the semantic layer 310 may generate the computer code on a rule-based manner, similar to the process of generating code to implement code definitions as described above.

After performing the mathematical operations on the raw data by implementing the corresponding computer code, the semantic layer 310 may output the generated curated data deliverable to the API 314. Additionally or alternatively, the semantic layer 310 may pass (350) the curated data deliverable to the security and client context layer 312. The security and client context layer 312 may pass the curated data deliverable to the security and client context layer 312. The security and client context layer 312 may determine whether the client is authorized to obtain the data in the curated data deliverable. Upon determining that the client has such authorization, the security and client context layer 312 may transmit (352) the curated data deliverable to the API 314.

The API 314 may then output (354) the curated data deliverable. The curated data deliverable may include at least one of (i) a physical client mart 316, (ii) a virtual client mart 318, (iii) a client analytics platform 320, or (iv) a data analytics report 322.

The physical client mart 316 may be a physical data storage having stored thereon data that are generated in response to the client query. Using a physical data storage may be advantageous when there is an enormous amount of data stored on the physical storage such that it would require more time to transmit the data over an electronic network than physically transporting the physical data storage.

The virtual client mart 318 may be one or more digital files including the data generated in response to the client query. The one or more digital files may be downloadable via the API 314.

The client analytics platform 320 may be a software or software component that can be integrated into a client platform, such as the client's data analysis software. For example, the client analytics platform may be an add-on to the client platform. The client may make queries on the client platform with the add-on and obtain query results instantaneously. To generate the client analytics platform 320, the semantic layer 310 may retrieve attributes of the client platform and generate the client analytics platform 320 based on the attributes such that the client analytics platform 320 may be integrated with the client platform. The attributes of the client platform may include coding language compatible with the client platform, existing API of the client platform, appearance of the client platform, infrastructure of the client platform, etc.

The data analytics reports 322 may be one or more digital files including the data generated in response to the client query. The one or more digital files may be viewable by the client via the API 314.

Example Process

Figure 4:
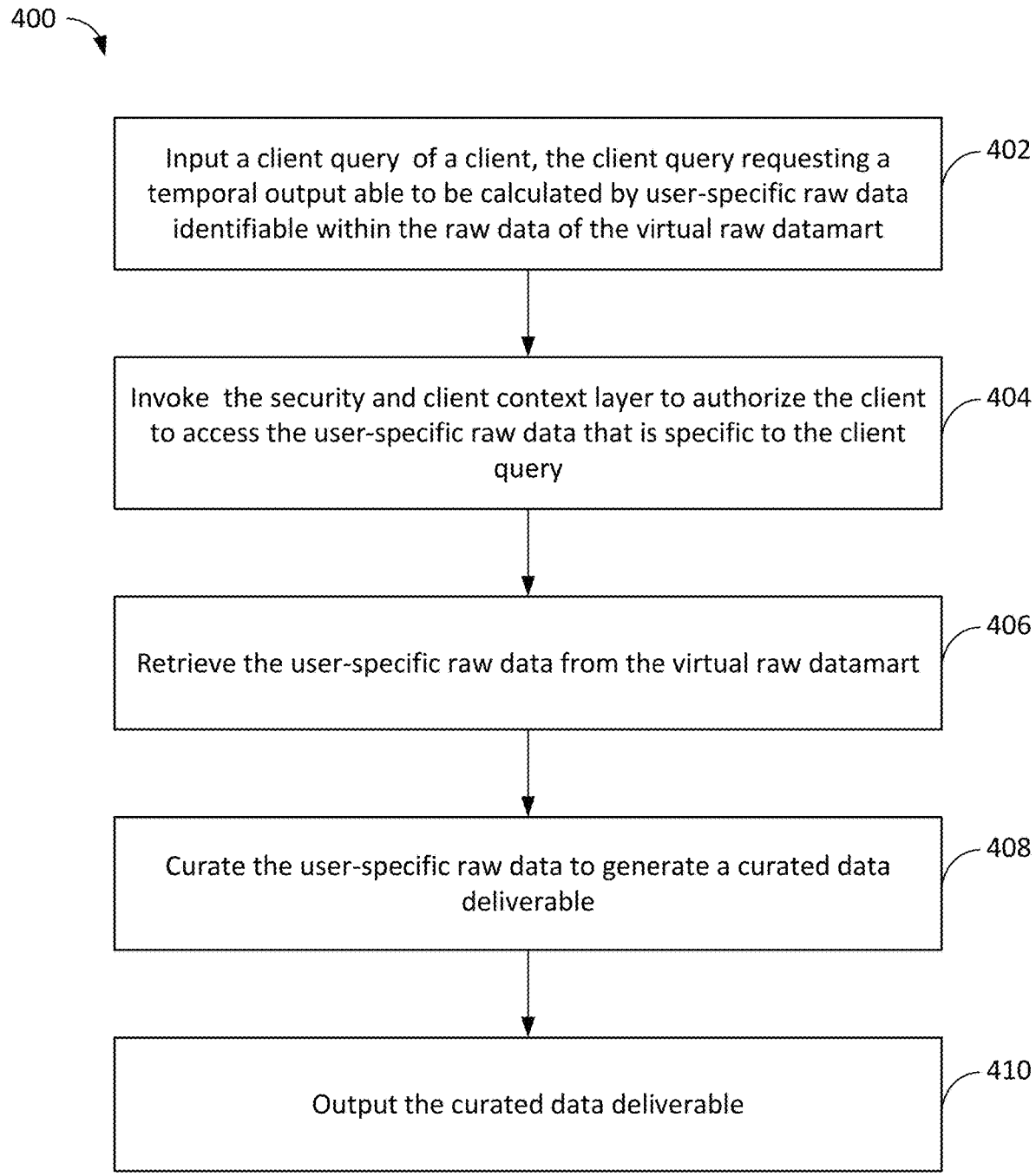
FIG. 4 is an example sequence diagram that illustrates a curated portable datamart method, according to some embodiments.

FIG. 4 depicts an example sequence diagram that illustrates a curated portable datamart method, according to some embodiments.

At block 402, a client may input a client query to an application programming interface (API), wherein the client query may request a temporal output able to be calculated by individual-specific raw data identifiable within the raw data of a virtual raw datamart, as described above with respect to step 340.

At block 404, the API may invoke a security and client context layer to authorize the client to access the individual-specific raw data that is specific to the client query, as described above with respect steps 342-344. In some embodiments, authorizing the client to access the individual-specific raw data includes retrieving contextual information including one or more client attributes of a client associated with the client query, and determining that the one or more client attributes match an authorization policy associated with the client query.

Responsive to the security and client context layer authorizing the client query, the API may invoke a semantic layer to: (i) at block 406, retrieve the individual-specific raw data from the virtual raw datamart, as described above with respect to steps 346-348, and (ii) at block 408, curate the individual-specific raw data to generate a curated data deliverable, wherein the curated data deliverable comprising temporal data generated from the one or more raw data items accessed by the semantic layer from the virtual raw datamart, as described above with respect to the semantic layer 310 in FIG. 3. In some embodiments, curating the raw data includes invoking the semantic layer to apply, based on the client query, one or more mathematical operations to the raw data to generate the curated data deliverable.

At block 410, the API may output the curated data deliverable, as described above with respect to step 354. In some embodiments, the curated data deliverable includes at least one of a physical client mart, a virtual client mart, a client analytics platform, or a data analytics report. In some embodiments, to generate the client analytics platform, the API may invoke the semantic layer to generate the client analytics platform based on one or more attributes of a client platform, the client analytics platform configured to be integrated in the client platform.

In some embodiments, the API may invoke a data aggregation layer to access a data service to retrieve the raw data and stream the raw data into the virtual raw datamart, as described above with respect to step 320.

In some embodiments, the virtual raw datamart may include at least a first portion and a second portion, the first portion dedicated to storing data of a first client or a first individual, the second portion dedicated to storing data of a second client or a second individual, and the first portion and the second portion configured to be virtually segregated from each other, as described above with respect to the virtual raw datamart 308 in FIG. 3. In some embodiments, the first portion and the second portion configured to be virtually segregated from each other includes accessing the first portion and the second portion requires separate authorizations. In some embodiments, the first portion and the second portion configured to be virtually segregated from each other includes the first portion associated with a first internet protocol (IP) address, the second portion associated with the second IP address, and the first IP address distinct from the second IP address.

It should be understood that not all blocks in FIG. 4 need to be implemented. Additional and alternative blocks may be implemented. The blocks FIG. 4 do not have to be implemented in the particular order as depicted.

Additional Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Unless specifically stated otherwise, discussions in the present disclosure using words such as "processing," "computing," "calculating." "determining," "presenting." "displaying." or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used in the present disclosure any reference to "one embodiment" or "an embodiment" means that a particular element, feature, structure, or characteristic described in connection with the embodiment is included in at least one embodiment or embodiment. The appearances of the phrase "in one embodiment" in various places in the specification are not necessarily all referring to the same embodiment.

As used in the present disclosure, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Upon reading this disclosure, those of skill in the art will appreciate still additional alternative structural and functional designs for generating private metaverse through the principles described herein. Thus, while particular embodiments and applications have been illustrated and described, it is to be understood that the disclosed embodiments are not limited to the precise construction and components disclosed in the present disclosure. Various modifications, changes and variations, which will be apparent to those skilled in the art, may be made in the arrangement, operation and details of the method and apparatus disclosed in the present disclosure without departing from the spirit and scope defined in the appended claims.

What is claimed is:

1. A curated portable datamart system configured to generate curated data deliverables, the curated portable datamart system comprising:
   one or more processors communicatively coupled to one or more computer memories; and
   a virtual raw datamart having stored thereon raw data comprising one or more raw data items, the virtual raw datamart communicatively coupled to the one or more processors;
   a semantic layer stored on the one or more computer memories and comprising computing instructions configured to access the virtual raw datamart, the computing instructions of the semantic layer implementing client-specific rules defining code for generating temporal data from one or more raw data items upon the semantic layer accessing the virtual raw datamart;

a security and client context layer stored on the one or more computer memories and comprising computing instructions configured to access the semantic layer; and an application programming interface (API) stored on the one or more computer memories and comprising computing instructions configured to access the security and client context layer, the computing instructions of the API further configured to receive requests via a client device;

wherein the computing instructions of the API, when executed by the one or more processors, cause the one or more processors to:

input a client query of a client, the client query requesting a temporal output able to be calculated by individual-specific raw data identifiable within the raw data of the virtual raw datamart;

invoke the security and client context layer to authorize the client to access the individual-specific raw data that is specific to the client query;

responsive to authorizing the client query, invoke the semantic layer to retrieve the individual-specific raw data from the virtual raw datamart, and curate the individual-specific raw data to generate a curated data deliverable, the curated data deliverable comprising temporal data generated from the one or more raw data items accessed by the semantic layer from the virtual raw datamart; and output the curated data deliverable.

2. The system of claim 1, further comprising a data aggregation layer configured to:

access a data service to retrieve the raw data; and stream the raw data into the virtual raw datamart.

3. The system of claim 1, wherein the virtual raw datamart includes at least a first portion and a second portion, the first portion dedicated to storing data of a first individual, the second portion dedicated to storing data of a second individual, and the first portion and the second portion configured to be virtually segregated from each other.

4. The system of claim 3, wherein the first portion and the second portion configured to be virtually segregated from each other includes accessing the first portion and the second portion requires separate authorizations.

5. The system of claim 3, wherein the first portion and the second portion configured to be virtually segregated from each other includes the first portion associated with a first internet protocol (IP) address, the second portion associated with the second IP address, and the first IP address distinct from the second IP address.

6. The system of claim 1, wherein to invoke the security and client context layer to authorize the client to access the individual-specific raw data, the computing instructions of the API, when executed by the one or more processors, cause the one or more processors to:

retrieve contextual information including one or more client attributes of the client, and determine that the one or more client attributes match an authorization policy associated with the client query.

7. The system of claim 1, wherein to curate the raw data, the computing instructions of the API, when executed by the one or more processors, cause the one or more processors to:

invoke the semantic layer to apply, based on the client query, one or more mathematical operations to the raw data to generate the curated data deliverable.

8. The system of claim 1, wherein the curated data deliverable includes at least one of a physical client mart, a virtual client mart, a client analytics platform, or a data analytics report.

9. The system of claim 1, wherein the curated data deliverable is a client analytics platform, and to generate the curated data deliverable, and the computing instructions of the API, when executed by the one or more processors, cause the one or more processors to:

invoke the semantic layer to generate the client analytics platform based on one or more attributes of a client platform, the client analytics platform configured to be integrated in the client platform.

10. A curated portable datamart method for generating curated data deliverables implemented by one or more processors via an application programming interface (API), the API stored on one or more computer memories communicatively coupled to the one or more processors and comprising computing instructions configured to access a security and client context layer, the computing instructions of the API further configured to receive requests via a client device, the method comprising:

inputting a client query of a client, the client query requesting a temporal output able to be calculated by individual-specific raw data identifiable within the raw data of a virtual raw datamart, the virtual raw datamart having stored thereon raw data comprising one or more raw data items, the virtual raw datamart communicatively coupled to the one or more processors;

invoking the security and client context layer to authorize the client to access the individual-specific raw data that is specific to the client query, the security and client context layer stored on the one or more computer memories and comprising computing instructions configured to access a semantic layer;

responsive to authorizing the client query, invoking the semantic layer to retrieve the individual-specific raw data from the virtual raw datamart, and curate the individual-specific raw data to generate a curated data deliverable, the curated data deliverable comprising temporal data generated from one or more raw data items accessed by the semantic layer from the virtual raw datamart; and outputting, via the API, the curated data deliverable, wherein the semantic layer is stored on the one or more computer memories and comprises computing instructions configured to access the virtual raw datamart, the computing instructions of the semantic layer implementing client-specific rules defining code for generating temporal data from one or more raw data items upon the semantic layer accessing the virtual raw datamart.

11. The method of claim 10, further comprising:

invoking a data aggregation layer to access a data service to retrieve the raw data and stream the raw data into the virtual raw datamart.

12. The method of claim 10, wherein the virtual raw datamart includes at least a first portion and a second portion, the first portion dedicated to storing data of a first individual, the second portion dedicated to storing data of a second individual, and the first portion and the second portion configured to be virtually segregated from each other.

13. The method of claim 12, wherein the first portion and the second portion configured to be virtually segregated from each other includes accessing the first portion and the second portion requires separate authorizations.

14. The method of claim 12, wherein the first portion and the second portion configured to be virtually segregated from each other includes the first portion associated with a first internet protocol (IP) address, the second portion associated with the second IP address, and the first IP address distinct from the second IP address.

15. The method of claim 10, wherein invoking the security and client context layer to authorize the client to access the individual-specific raw data includes:
   retrieving contextual information including one or more client attributes of the client, and
   determining that the one or more client attributes match an authorization policy associated with the client query.

16. The method of claim 10, wherein curating the raw data includes invoking the semantic layer to apply, based on the client query, one or more mathematical operations to the raw data to generate the curated data deliverable.

17. The method of claim 10, wherein the curated data deliverable includes at least one of a physical client mart, a virtual client mart, a client analytics platform, or a data analytics report.

18. The method of claim 10, wherein the curated data deliverable is a client analytics platform, and to generate the curated data deliverable, and the method comprises: invoking the semantic layer to generate the client analytics platform based on one or more attributes of a client platform, the client analytics platform configured to be integrated in the client platform.

19. A computer readable storage medium for generating curated data deliverables, the computer readable storage medium having stored thereon (i) computing instructions of a semantic layer, (ii) computing instructions of a security and client context layer, and (iii) computing instructions of an application programming interface (API),
   wherein the computing instructions of the semantic layer are configured to access a virtual raw datamart, the computing instructions of the semantic layer implement client-specific rules defining code for generating temporal data from one or more raw data items upon the semantic layer accessing the virtual raw datamart, the virtual raw datamart having stored thereon raw data comprising one or more raw data items, the virtual raw datamart communicatively coupled to one or more processors,
   wherein the computing instructions of the security and client context layer are configured to access the semantic layer,
   wherein the computing instructions of the API are configured to access the security and client context layer, the computing instructions of the API are further configured to receive requests via a client device, and
   wherein the computing instructions of the API, when executed by one or more processors, cause the one or more processors to:
      input a client query of a client, the client query requesting a temporal output able to be calculated by individual-specific raw data identifiable within the raw data of the virtual raw datamart;
      invoke the security and client context layer to authorize the client to access the individual-specific raw data that is specific to the client query;
      responsive to authorizing the client query, invoke a semantic layer to
         retrieve the individual-specific raw data from the virtual raw datamart, and
         curate the individual-specific raw data to generate a curated data deliverable, the curated data deliverable comprising temporal data generated from one or more raw data items accessed by the semantic layer from the virtual raw datamart; and
      output, via the API, the curated data deliverable.

20. The computer readable storage medium of claim 19, wherein the curated data deliverable is a client analytics platform, and to generate the curated data deliverable, and the computing instructions, when executed by the one or more processors, cause the one or more processors to:
   invoke the semantic layer to generate the client analytics platform based on one or more attributes of a client platform, the client analytics platform configured to be integrated in the client platform.

* * * * *